(No Model.) 5 Sheets—Sheet 1.
G. H. PATULLO.
SAWMILL CARRIAGE.
No. 576,820. Patented Feb. 9, 1897.
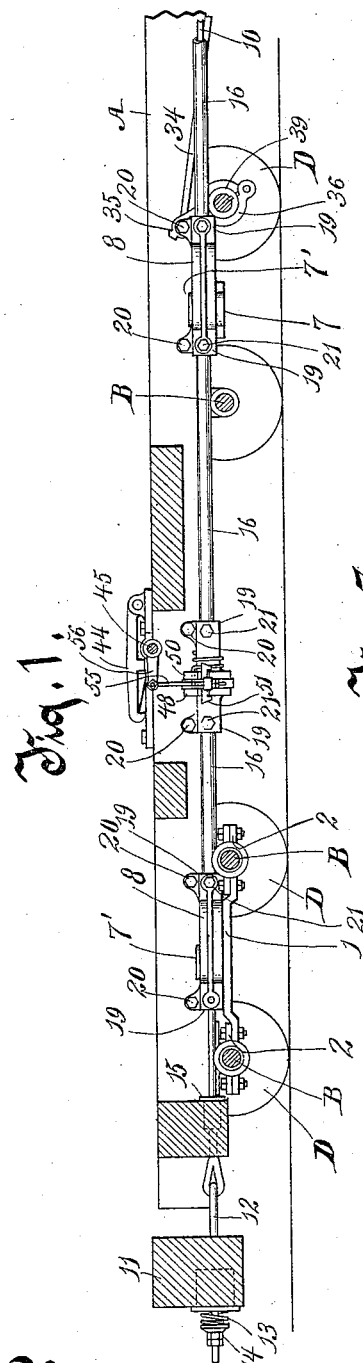
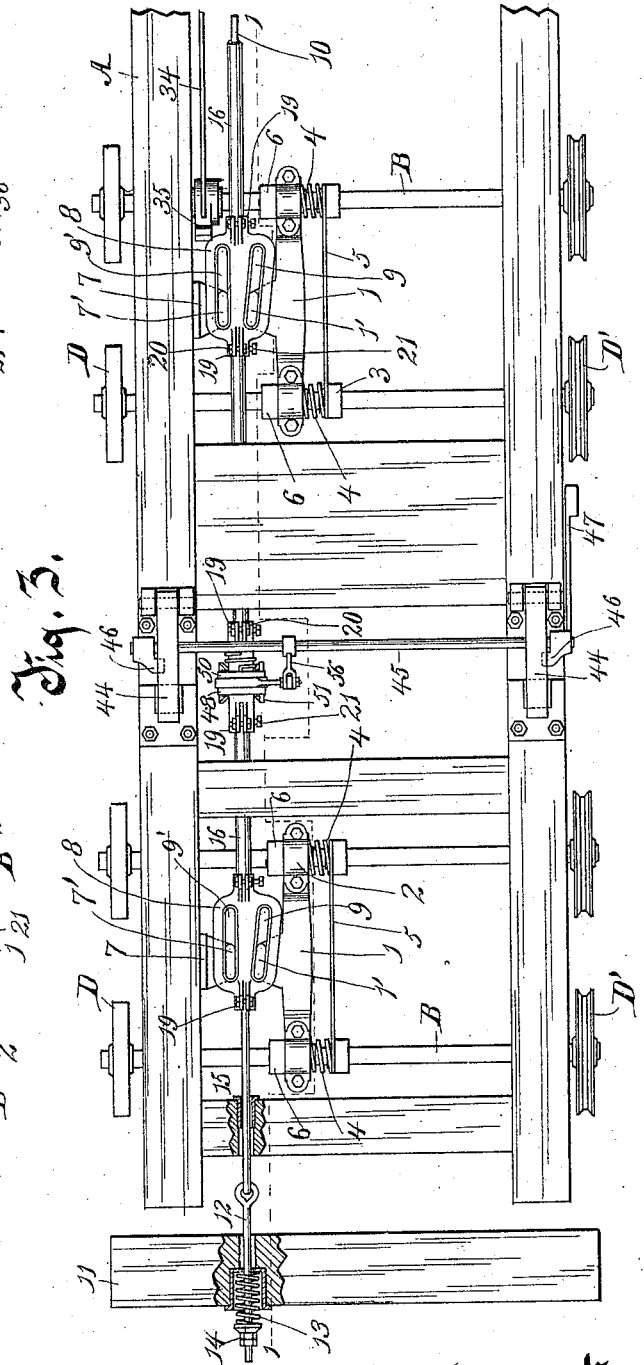
Witnesses.
Inventor.
George H. Patullo
By Bendrick Morsell
Attorneys.

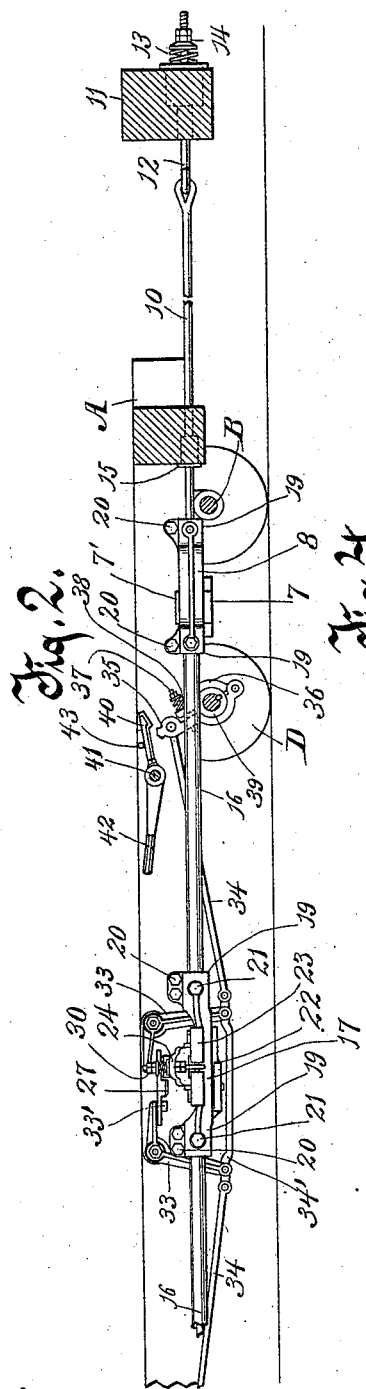

(No Model.) 5 Sheets—Sheet 3.

G. H. PATULLO.
SAWMILL CARRIAGE.

No. 576,820. Patented Feb. 9, 1897.

Witnesses.
C. N. Keeney
Anna V. Faust

Inventor.
George H. Patullo
By Benedict & Morsell
Attorneys.

(No Model.) 5 Sheets—Sheet 4.
G. H. PATULLO.
SAWMILL CARRIAGE.
No. 576,820. Patented Feb. 9, 1897.
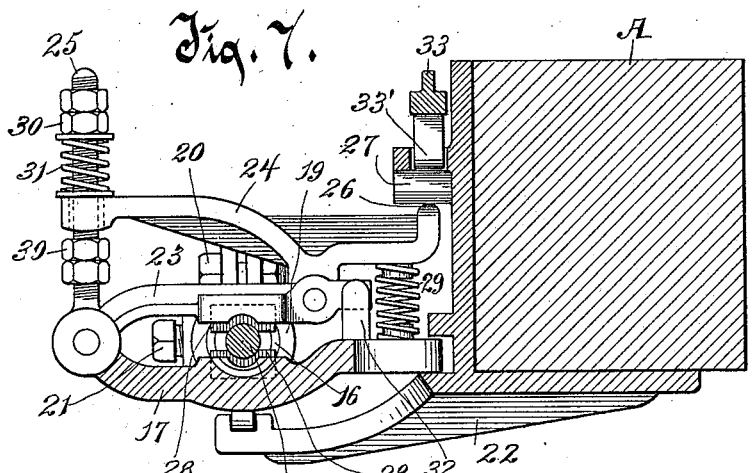
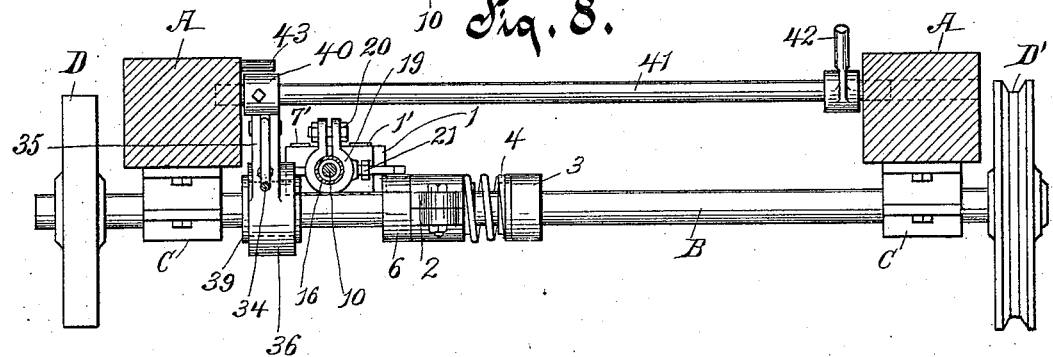
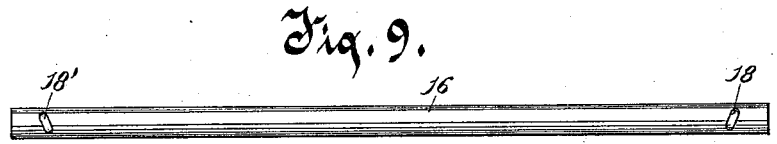
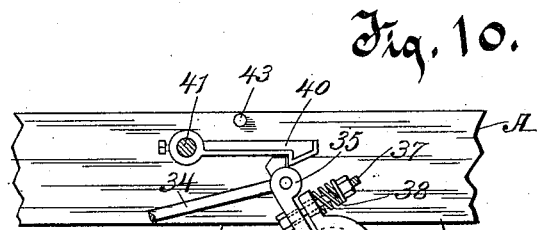
Witnesses.
Inventor.
George H. Patullo
By Benedict Morsell
Attorneys.

(No Model.) 5 Sheets—Sheet 5.
G. H. PATULLO.
SAWMILL CARRIAGE.
No. 576,820. Patented Feb. 9, 1897.
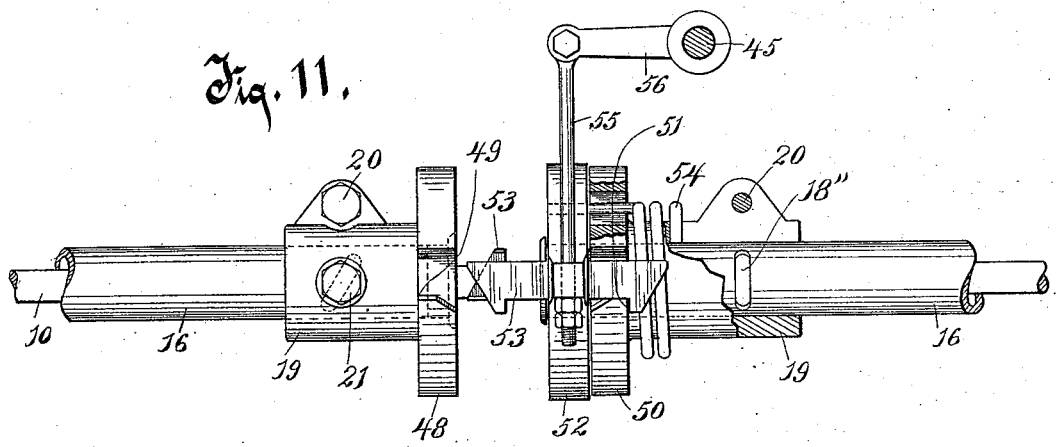
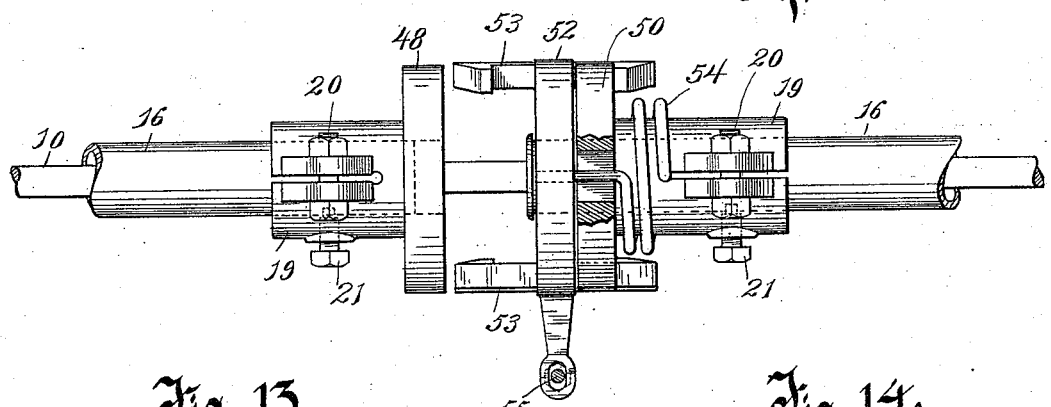
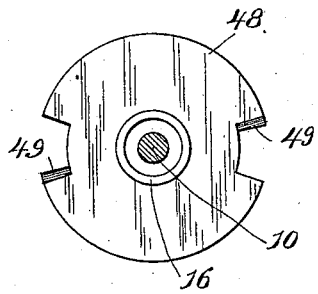 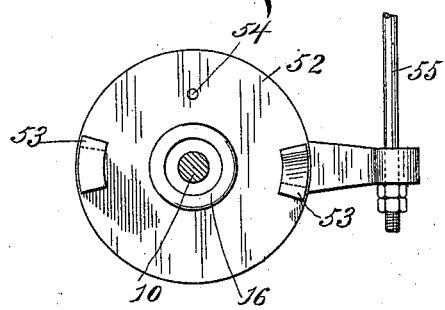
Witnesses.
Inventor.
George H. Patullo
By Kendrick & Mosell
Attorneys.
THE NORRIS PETERS CO., PHOTO-LITHO., WASHINGTON, D. C.

UNITED STATES PATENT OFFICE.

GEORGE H. PATULLO, OF BAY CITY, MICHIGAN.

SAWMILL-CARRIAGE.

SPECIFICATION forming part of Letters Patent No. 576,820, dated February 9, 1897.

Application filed August 19, 1895. Renewed October 12, 1896. Serial No. 608,677. (No model.)

*To all whom it may concern:*

Be it known that I, GEORGE H. PATULLO, of Bay City, in the county of Bay and State of Michigan, have invented a new and useful Improvement in Sawmill-Carriages, of which the following is a description, reference being had to the accompanying drawings, which are a part of this specification.

My invention relates to that class of reciprocating sawmill-carriages which are so constructed that the carriage may be shifted laterally or offset from the line of the saw when it is run back, so that there will be no danger of contact or engagement of the saw with the log during such return movement of the carriage and log.

The object of the present invention is to provide improved means for accomplishing the offsetting of the carriage on its axles and in connection therewith other improved means for coupling two or more carriages together.

There is a general similarity in the general construction of the carriage and some features of the offsetting mechanism to corresponding parts and features in the carriage and devices shown and described in my application, Serial No. 540,230, filed March 1, 1895, for a patent for improvements in sawmill-carriages, but in that application the devices for actuating the mechanism for offsetting the carriage were adapted to act independently of the movement of the carriage toward front or rear, whereas in the present invention the shifting of the carriage laterally or offsetting it is dependent on the movement of the carriage forward and back in its line of travel.

Figure 5:
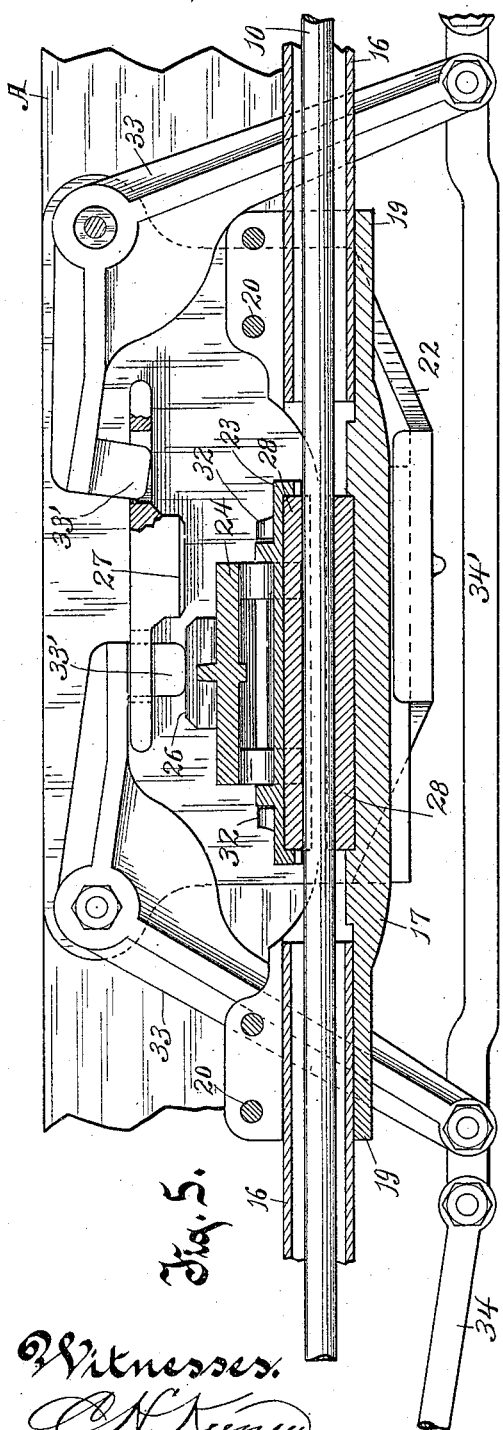
Figure 6:
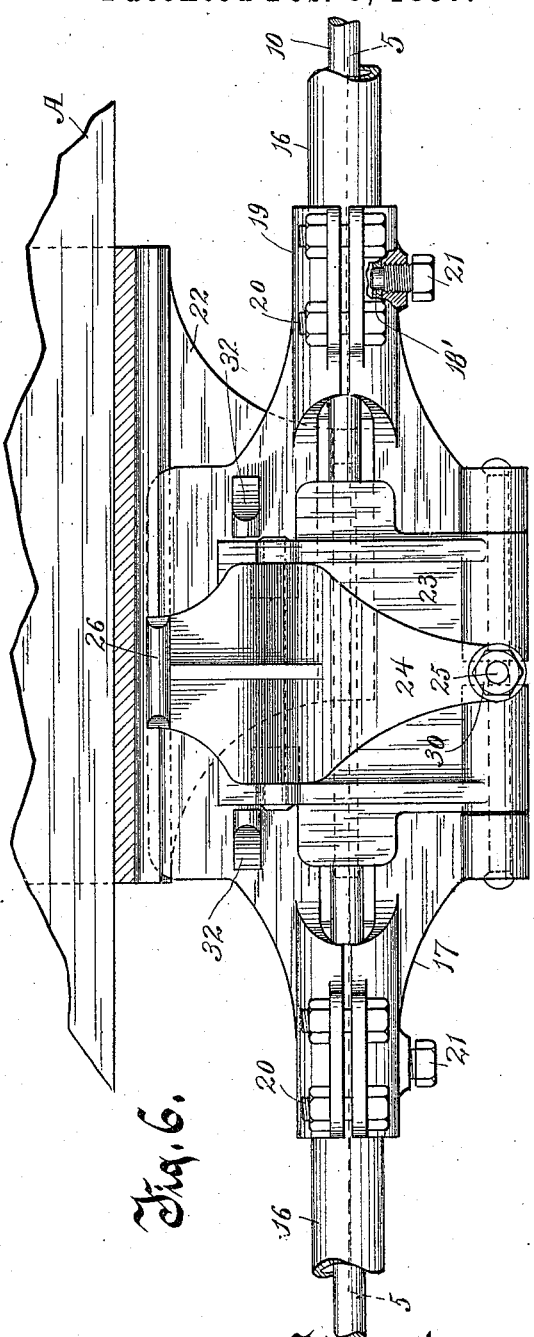

In the drawings, Figure 1 is a vertical longitudinal section on line 1 1 of Fig. 3 of a portion of a sawmill-carriage having my improved mechanism thereon; and Fig. 2 is a vertical longitudinal section on line 2 2 of Fig. 4 of the remainder of the carriage beyond what is shown in Fig. 1, Fig. 2 being a continuation of Fig. 1 at the right thereof. Figs. 3 and 4 are together a top plan view of a sawmill-carriage with my improved mechanism thereon, Fig. 4 being a continuation of the carriage at the right of that portion shown in Fig. 3. Fig. 5 is a longitudinal vertical section of the cable-gripping device employed in my invention in connection with other devices for accomplishing the offsetting of the carriage. The section is on line 5 5 of Fig. 6. Fig. 6 is a top plan view of the cable-gripping device, portions of which are shown in section in Fig. 5. Fig. 7 is an end view of the cable-gripping device shown in section and in plan in Figs. 5 and 6. Fig. 8 is a transverse vertical section of the carriage on line 8 8 of Fig. 4, showing also the devices at the right of the line in Fig. 4. Fig. 9 is a detail of the tubular rod that connects push-blocks and the cable-gripping devices and serves also as a support for and a guard about the cable. Fig. 10 is a detail of the mechanism for actuating the offsetting devices. Figs. 11 and 12 illustrate from different points of view the carriage-coupling devices, parts being broken away for convenience of illustration. Figs. 13 and 14 are elevations of the faces of the coupling heads or disks on each carriage at the left and right, respectively, in Figs. 11 and 12.

In the drawings, A is the frame, substantially constituting the carriage. The frame is provided with a plurality of axles B, journaled and movable endwise in boxes C, secured to the frame. The axles are provided with fixed wheels D D', adapted to travel on tracks therefor, the wheels at one end of the axles at least being grooved or flanged to retain them properly on the track against lateral movement. The frame or carriage is a little narrower than the distance between the wheels on the same axle. The carriage is adapted to be reciprocated endwise on the track, means for reciprocating it not being shown, as such means are well known and form no part of my invention. The construction also provides for a slight movement of the carriage laterally on the axles, thereby permitting of the offsetting of the carriage from the saw, to which function my invention chiefly relates. For accomplishing the offsetting of the carriage on the axles, bars or blocks 1 are suitably attached each to one or more axles of the carriage conveniently by means of boxes 2 on the blocks 1 and forming a part thereof, which boxes encircle the axles, permitting revoluble motion thereof therein and at the same time allowing a permissible movement of the bar or block on the axles endwise thereof. At a little distance at the rear from the boxes 2 collars 3 3 are secured adjustably to the axles B B, and springs 4 4 are interposed between the collars and the boxes, whereby the bars or blocks 1 are held yieldingly to their work. Bearing plates or washers 5 5 are interposed between the collars 3 and the springs 4. Collars 6, secured to the axles in front of the blocks 1, prevent undue movement of the blocks in that direction. The strength of the springs 4 is such as normally to hold the bars 1 up to their work constantly, but they are adapted to yield under great abnormal strain, so as thereby to prevent the breaking of the parts. In front of the bars 1 and opposite thereto other blocks 7 are secured rigidly to the carriage A. These blocks 1 and 7 are respectively provided with upturned bearing members 1' and 7'. These bearing members 1' and 7' are located opposite each other at a little distance apart and are preferably elongated longitudinally of the carriage, so as to provide more-extended bearing-surfaces, the bearing-surface of one of which at least is inclined or is disposed at an oblique angle to the bearing-surface of the other member. There are preferably two sets of these bearing-blocks 1 and 7 on each carriage, located near the ends thereof. More than two sets of these bearing-blocks may be used, if desired. With each set of these bearing-blocks a movable push-block 8 is used. These push-blocks are each constructed with two elongated slots 9 9', arranged adjacent and opposite to each other, one of which is disposed parallel with the line of motion of the carriage longitudinally, and the other is inclined or obliquely disposed toward the forward and back line of motion of the carriage. The upturned members 1' 7' of the bearing-blocks 1 and 7 fit movably in these slots 9 and 9', respectively, and by a movement of the push-blocks longitudinally past the bearing-blocks in one direction the bearing-blocks are separative, and the carriage is correspondingly moved laterally on the axles, and by the movement of the push-blocks in the other direction the bearing-blocks are correspondingly drawn toward each other, and the carriage is shifted laterally in the other direction on the axles.

For holding the push-blocks 8 temporarily stationary while the carriage moves a little longitudinally past them, whereby by means of the bearing-blocks 1 and 7 the carriage is offset, I provide devices and mechanism substantially as follows: A cable 10 is stretched parallel with the line of motion of the carriage longitudinally from one end of its line of travel to the other and is secured in position by being attached at its ends conveniently to the bumpers or timbers 11 11 and preferably by means of bolts 12 12, inserted movably through the timbers and held yieldingly therein (at one end at least) by a spring 13, interposed between the timbers and a nut 14 on the extremity of the bolt. By this construction the cable can be drawn tight, and yet under considerable strain it will yield endwise a little, so as thereby to obviate breaking, and even, if desired, to permit of a slight yielding of the cable when it is caught by the gripping mechanism on the carriage, thus providing against undue shock or sudden strain on the cable or devices connected intimately therewith. This cable is so disposed as to pass loosely through cross-beams of the carriage in suitable apertures therefor, which are preferably provided with sleeve boxes or bushings 15. The cable 10 also extends loosely through tubular rods 16, which are used to connect the push-blocks 8 8 together or to connect them, respectively, to the frame or base piece 17 of the cable-gripping mechanism, preferably interposed between two of the push-blocks. Each section of this tubular connecting-rod is provided at one end at least with an oblique slot 18, Fig. 9, and at the other extremity is provided with a reversely-disposed oblique slot 18' or with a transverse slot 18", Fig. 11. For inserting these connecting-rods in and securing them to the push-blocks 8 and the base-piece 17 these push-blocks and the base-piece are provided with clamping members 19, constructed to nearly encircle the tubular rod and to be clamped together about it by means of bolts 20. Also these clamping devices are each provided with a screw-threaded pin 21, arranged to turn through the side of the clamping device into a slot 18, 18', or 18". When the parts are to be connected together, a section of the rod 16 is inserted in the clamp of a push-block 8 and in the clamp of the base-plate 17. The pins 21 are then carried into the slots 18 and 18', respectively, by turning them through the sides of the clamps, and the desired position and adjustment of the push-block and the base-plate relative to each other are secured by rotating the section of the rod 16, so as to carry the connected parts farther apart or to bring them nearer together, as desired, and when thus adjusted the rod is secured rigidly thereto by tightening the nuts on the bolts 20 and thus clamping the rod in place.

For gripping the push-blocks 8 temporarily to the cable 10, so that the blocks shall not move longitudinally with the carriage on which they are mounted, I provide mechanism as follows: A base-plate 17 is arranged to permit the carriage to slide longitudinally thereof, said carriage having fixed thereto a bracket 22, which bracket is provided with ways to receive the base-plate and is located directly beneath the cable 10, and a jaw 23, hinged to the plate 17 at one side of the cable, extends over and across the cable, and the free extremity of this jaw 23 is provided with a thereto-pivoted and tiltable plate-arm 24, one extremity of which arm is secured movably and adjustably to a swinging bolt 25, pivoted on the pin that hinges together the base-piece 17 and the jaw 23, and the other extremity of the arm 24 projects a little beyond the free extremity of the jaw 23 and is there upturned, terminating in a horizontally-disposed bearing-surface 26. The bracket 22, secured to a sill of the carriage, is provided with a laterally-projecting lug or bearing member 27, which is adapted to pass over the extremity of the arm 24, by which the arm is held down to the lowest limit of its travel while the lug passes over the arm, and in which position the jaw 23 and the bed-piece 17 are gripped to the cable 10 by and through the interposed friction-blocks 28. A spring 29, interposed between the free extremity of the arm 24 and the bed-piece 17, is adapted to raise the jaw 23 when the lug 27 has passed beyond the arm 24 and release the hold of the gripping device on the cable. A suitable adjustment of the arm 24 is secured by the nuts 30 30, turning on the bolt 25 respectively above and below the arm 24, and a certain amount of flexibility in the movement of the arm is provided for by means of the spring 31, interposed between a nut 30 and the arm. Lugs 32 32, projecting upwardly from the base-piece 17 at each side of the jaw 23 near its extremity, serve as stops to prevent the swinging around of the jaw 23, or, in other words, to prevent undue strain on the parts at the point of hinging the jaw 23 to the base-piece 17.

For automatically forcing the plate-arm 24 downwardly, so as to grip the cable between the jaw 23 and plate 17 and so that the extremity of the arm 24 will pass beneath the bearing member 27, I provide the bell-crank levers 33, one at each side of the lug 27, which levers are pivoted on the sill of the carriage and are each provided with a finger 33', adapted to contact with the extremity of the arm 24 and when the lever is tilted to force it down in line with or just below the line of the lower surface of the bearing-block 27 and so that the cable is gripped between the jaw 23 and bed-piece 17. These lever-arms 33 are connected together by a rod 34', the arrangement being such that when the finger 33' of one of the levers is thrown down against and with the arm 24 the other finger 33' will be correspondingly elevated. These bell-crank levers are also connected to one or more of the axles of the carriage by and through other connecting-rods 34 and by lever-arms 35, clamped frictionally and yieldingly to axles of the carriage on which they are mounted. These lever-arms 35 are each so constructed as partially to encircle an axle, and are provided with a jaw 36, pivoted to the extremity thereof, which jaw also partially encircles the axle and at its free extremity is secured adjustably to the lever-arm 35 by means of a bolt 37, passing through the arm and loosely through the jaw, a spring 38 being interposed between the jaw and a nut turning on the bolt, whereby the jaw is held yieldingly toward the lever-arm. A gib-formed sleeve 39 is splined on the axle, and this sleeve serves for a bearing about which the lever 35 is secured frictionally and yieldingly by means of the jaw 36 clamping it thereto. A latch 40, projecting radially from a rock-shaft 41, is adapted to engage the extremity of the lever-arm 35 either at one side or at the other thereof, and prevent the tilting of the arm when desired. It has a hook engagement with one side, as shown in Fig. 10, and when the arm 35 is thrown over in the opposite direction to that shown in Fig. 10 the end of the latch 40 merely by bearing against the projection of the arm 35 holds said arm to such position. The rock-shaft 41, journaled in the carriage, is provided with a counterpoise-handle 42, adapted by its weight to lift the latch 40 against the stop-pin 43 and hold it normally out of engagement with the lever-arm 35.

It will be understood that in operation when the carriage commences to run toward the left (Figs. 1 and 2) the arms 35 on the axles will by the rotary motion of the axles be tilted over toward the left into the positions shown in Figs. 1 and 2, and that thereby the bell-crank levers 33 will be thrown into the positions shown in Figs. 2 and 5; that when the carriage is being actuated normally and the shifting of the carriage laterally is occurring regularly at the beginning of the reverse movement of the carriage longitudinally in both directions the gripping mechanism, including plate 24, will be at the location relative to the other devices at which it is shown in Fig. 5, and that as the finger 33' of the arm 33 at the left in Fig. 5 comes down, forcing the plate 24 below the horizontal plane of the under surface of lug 27, the cable will be gripped and thereby the push-plates 8 will be held temporarily stationary until the carriage has moved toward the left sufficiently far to take the lug 27 past the plate 24, whereupon the plate will be immediately raised by the action of spring 29, releasing the grip of jaw 23 and base-piece 17 on the cable, permitting the push-blocks 8 thereafter to move with the carriage in its travel to the left, the grip of the arms 35 on the axles being such as to be readily overcome and permit of the rotating of the axles therein when the bracket 22 has reached the limit of its travel on the base-plate 17. The position of the parts is then that which is shown in Figs. 1 and 2. This operation will have shifted the carriage laterally on the axles into the position relative thereto shown in Figs. 3 and 4. On reversing the motion of the carriage on the track a reverse operation of the gripping and offsetting mechanism will occur, which will shift the carriage laterally on the axles in the other direction. Should it be desired to run the carriage back and forth on its track without moving it laterally on the axles, the latch 40 is put into engagement with the lever 35, preventing its overthrow and thereby obviating any action of the gripping devices.

It is sometimes desirable to connect two or more carriages together, and for accomplishing this in connection with my improved means for offsetting the carriage I have provided devices adapted for coupling together carriages having this improved mechanism thereon. Latches 44, substantially such as are in common use, are pivoted on the frame of one carriage near its extremity, and are adapted to engage a catch on the frame of the adjacent carriage to couple the carriages together. These latches are so formed that by gravity they automatically engage the catches on the adjacent carriage when the two are brought together. For conveniently and concurrently releasing the latches, one at each side of the carriage, I provide a rock-shaft 45, journaled in the frame, which rock-shaft is provided with eccentric fingers 46, entering under the respective latches and adapted by the oscillation of the rock-shaft to lift them out of engagement with the catches. A foot-lever 47, fixed on and projecting radially from the rock-shaft, is a convenient means for oscillating it, it being understood that the weight of the latches 44 is sufficient to hold the parts normally in position to engage with the catches on the adjacent carriage.

I also provide a disk 48, clamped on the end of a section of the rod 16 in substantially the same manner that the push-blocks 8 are clamped thereto, which disk is located at the end of that carriage that is provided with the catches for engaging the latches 44. This disk 48 is cut away in such manner as to form catches 49 thereon. A substantially similar and complementary disk 50, having corresponding catches 51, is secured to a section of the tubular rod 16 at the extremity of the carriage on which the latches 44 are pivoted. In front of the disk 50 a disk 52 is swiveled concentrically therewith on a gib-formed extension of the rod 16. This disk 52 is provided with two double latches 53, adapted concurrently to engage the catches 49 and 51, respectively. A torsional spring 54, secured to the hub or clamp of the disk 50 and to the disk 52, holds the disk 52 rotatively in position to automatically engage the catches 49 and 51. The front ends of the latches 53 are beveled off, so as to adapt them automatically to yield and pass over the catches when the disks 48 and 50 are brought together. For releasing these catches 53 a rod 55 connects the disk 52 at a distance from its axis with a radial arm 56, fixed on the rock-shaft 45.

It will be noted that by the construction described the carriages themselves and the offsetting devices are automatically coupled together when the carriages are brought up to each other and that by means of the rock-shaft 45 and the devices attached thereto the carriages and the offsetting mechanism may be concurrently disengaged.

Having thus described my invention, what I claim, and desire to secure by Letters Patent, is—

1. The combination, of a sawmill-carriage, offsetting mechanism engaging the carriage, a fixed cable stretched along the line of travel of the carriage, and gripping mechanism connected with the offsetting device, and adapted, for a limited time, to grip the cable, and thereby hold said offsetting device temporarily stationary as the carriage travels forward, whereby the carriage is moved laterally.

2. The combination with a reciprocable sawmill-carriage movable laterally on its axles, of bearing-blocks secured in sets opposite each other respectively on the axles and on the carriage, a push-block movable longitudinally with the carriage and having surfaces bearing respectively against the bearing-blocks aforesaid one at least of which surfaces is oblique to the axis of the carriage, a fixed cable stretched along the line of longitudinal travel of the carriage, and gripping mechanism connected with the push-block, and adapted, for a limited time, to grip the cable, and thereby hold said push-block temporarily stationary as the carriage travels forward, whereby the carriage is moved laterally.

3. The combination with a reciprocable and offsetting sawmill-carriage, of a fixed cable stretched along the line of travel of the carriage, push-blocks and cable-gripping mechanism mounted on the carriage and a tubular rod or rods connecting the push-blocks and the gripping devices through which rod or rods the cable extends.

4. In a sawmill-carriage having offsetting mechanism, a tubular rod connecting two or more of the devices in the offsetting mechanism, said rod being provided with an obliquely-disposed slot, a fixed cable passing through the tubular rod, clamps on the devices united by the rod, said clamps adapted for holding the rod to the cable, and a pin in the clamp entering the oblique slot in the rod.

5. In a sawmill-carriage having offsetting mechanism, the combination, of a tubular rod connecting two or more of the devices in the offsetting mechanism, a fixed cable passing through the tubular rod, and gripping mechanism connecting with the tubular rod, said gripping mechanism adapted, for a limited time, to grip the cable, and thereby hold said offsetting device temporarily stationary as the carriage travels forward, whereby the carriage is moved laterally.

6. A cable-gripping device for a sawmill-carriage, comprising a base-piece which is adapted to be held temporarily stationary while the carriage travels thereon, a jaw hinged to the base-piece adapted to grip a cable between it and the base-piece, an adjustable arm pivoted on the free extremity of the jaw, and a spring adapted to push the jaw away from the base-piece.

7. In a gripping device the combination of a base-piece, a jaw pivoted thereto, an arm pivoted on the free end of the jaw, a bolt connecting one extremity of the arm movably to the hinge of the jaw, and a spring interposed between the arm and the base-piece adapted to force the jaw away from the base-piece.

8. A gripping device, comprising a base-piece, a jaw hinged to the base-piece, an arm pivoted on the free end of the jaw, a bolt hinged to the pivot of the jaw-hinge which bolt passes movably through one extremity of the arm, nuts on the bolt on either side of the arm and a spring interposed between the arm and a nut at one side thereof, and a spring interposed between the arm and the base-piece adapted to force the jaw away from the base-piece.

9. In a reciprocable and offsetting sawmill-carriage, the combination with the carriage and an axle or axles thereof, of a tilting arm or arms 35 secured yieldingly to the axle or axles, grip-actuating levers 33 pivoted on the carriage, and rods connecting the tilting arms and the grip-actuating lever or levers.

10. The combination with a sawmill-carriage, and a cable-gripping device thereon, of grip-actuating levers 33, and a lug 27 mounted on the carriage and adapted to actuate and control the gripping device.

11. In gripping mechanism in a sawmill-carriage, the combination with the carriage-frame, of a bracket 22 provided with ways, a base-piece 17 which the ways of the carriage fit, and on which base-plate the carriage is adapted to travel limitedly while the plate is stationary, said plate also provided with stops 32, a jaw hinged to the base-piece, the jaw being so disposed as to be adapted to grip a cable to the base-piece and when gripping the cable to have its free end between the stops aforesaid, an adjustable arm 24 mounted on the free extremity of the jaw, and a lug 27 adapted to hold the jaw in engagement with the cable interposed between it and the base-piece while passing said arm.

12. In a sawmill-carriage, the combination with the frame and its axles, and a radial arm mounted frictionally and yieldingly thereon, of a swinging latch 40 mounted on the frame and adapted to engage the radial arm aforesaid at either side thereof and lock it, and a gravity-acting handle secured to the latch adapted to hold it normally out of engagement with the radial arm.

13. The combination with a plurality of reciprocative and offsetting sawmill-carriages and a cable stretched along the route of the carriages, of tubular rods connecting offsetting devices on the carriage and through which rods the cable extends, complementary disks fixed on the extremities of the rods at the ends of the carriages, said disks being provided with catches, and a disk swiveled on a gib-formed tubular extension of one of said rods outside one of said terminal disks, said swiveled disk being provided with catch-engaging latches.

In testimony whereof I affix my signature in presence of two witnesses.

GEORGE H. PATULLO.

Witnesses:
W. J. McCORMICK,
W. H. HURLEY.